Oct. 14, 1924.       1,511,529
H. R. STANDLEE
COMBINED SPIDER AND GAS SAVER
Filed Sept. 19, 1923
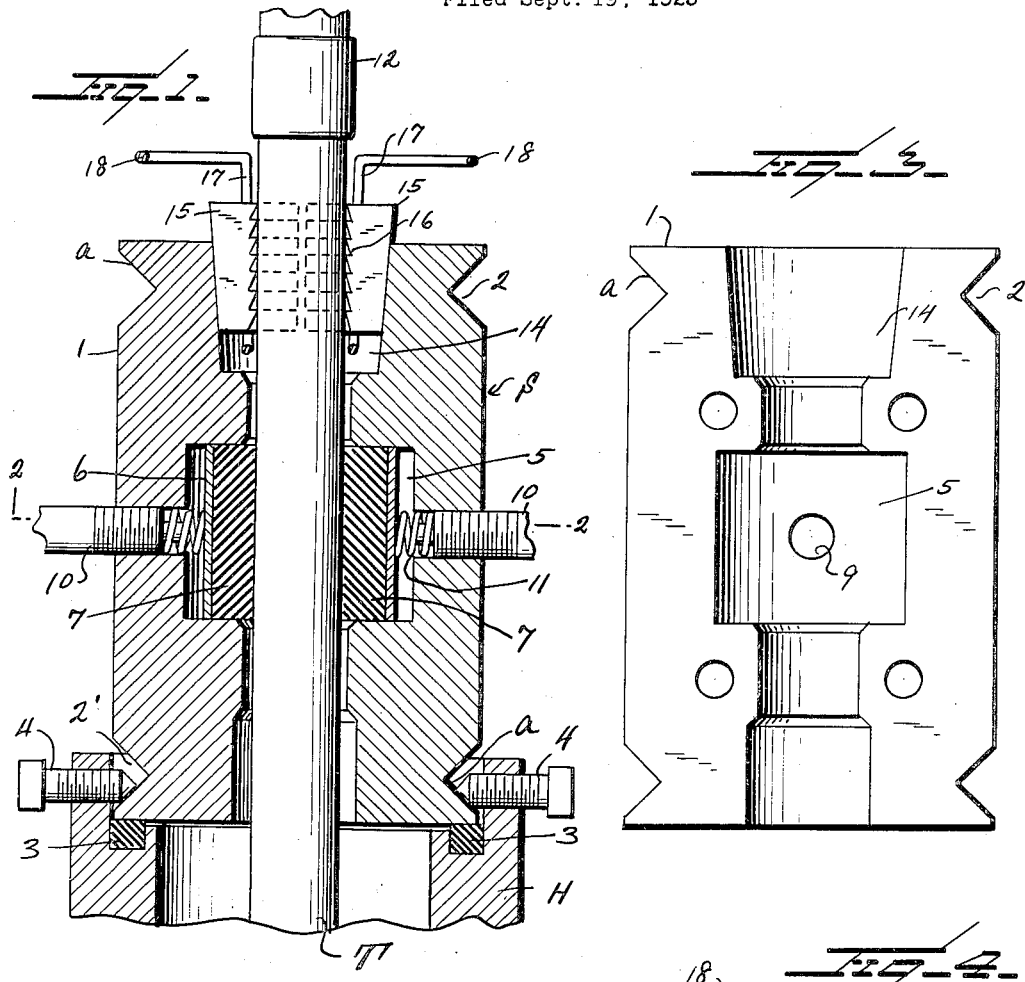
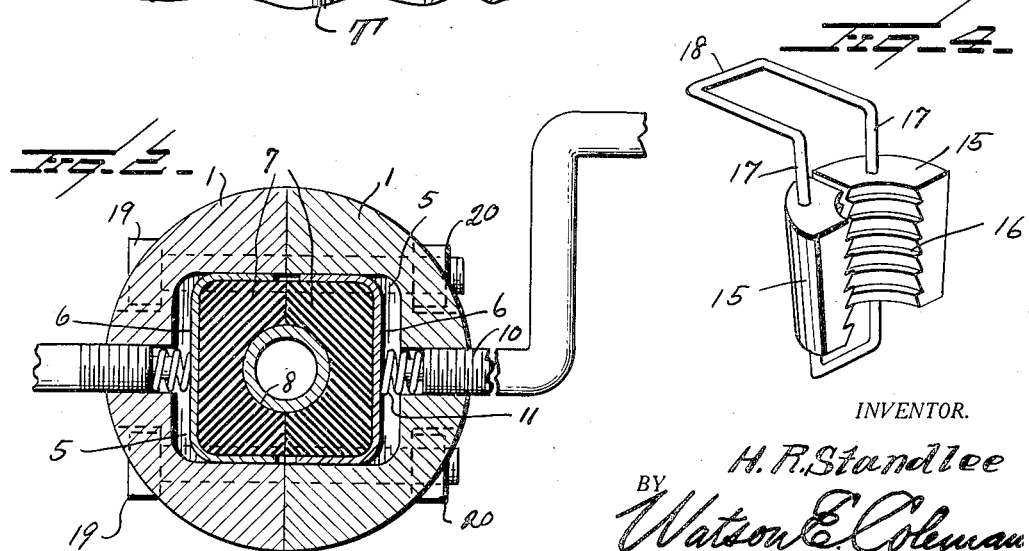
INVENTOR.
H. R. Standlee
BY Watson E. Coleman
ATTORNEY.

Patented Oct. 14, 1924.

1,511,529

UNITED STATES PATENT OFFICE.

HARVEY R. STANDLEE, OF TULSA, OKLAHOMA.

COMBINED SPIDER AND GAS SAVER.

Application filed September 19, 1923. Serial No. 663,641.

*To all whom it may concern:*

Be it known that I, HARVEY R. STANDLEE, a citizen of the United States, residing at Tulsa, in the county of Tulsa and State of Oklahoma, have invented certain new and useful Improvements in Combined Spiders and Gas Savers, of which the following is a specification, reference being had to the accompanying drawings.

This invention relates to a combined spider and gas saver and has relation more particularly to a device of this general character especially designed and adapted for use in connection with the laying or withdrawing of tubing in an oil or other deep wells and it is an object of the invention to provide a novel and improved device of this general character which, when in applied position, serves to prevent the passage of oil or gas up through the casing and out through the spider.

It is also an object of the invention to provide a novel and improved device of this general character provided in one end portion with a socket to receive requisite slips whereby it is possible to lay or withdraw the tubing with a single elevator yet which can also be employed with equal facility with two elevators.

Another object of the invention is to provide a novel and improved device of this general character comprising a tubular member having the intermediate portion of its bore enlarged to receive suitable packing to engage a tubing disposed therethrough to prevent leakage of either oil or gas and which packing is yieldably supported in order to facilitate the passage through the device of the collars comprised in the tube line and also to assure the packing having requisite engagement with the tubing.

An additional object of the invention is to provide a novel and improved device of this general character provided with interior packing for engagement with an inserted tubing together with means for adjusting the packing to maintain the same in proper contact with the tubing.

The invention consists in the details of construction and in the combination and arrangement of the several parts of my improved combined spider and gas saver whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a combined spider and gas saver constructed in accordance with an embodiment of my invention and in applied position;

Figure 2 is a sectional view taken substantially on the line 2—2 of Figure 1;

Figure 3 is an elevational view of the inner or straight face of one of the sections of the spider as herein disclosed; and Figure 4 is a view in perspective of a pair of slips as herein disclosed.

As disclosed in the accompanying drawings, my improved spider S comprises two duplicate sections 1 which, when assembled, provide a substantially cylindrical member of requisite dimensions and the opposite end portions of each of the sections 1 have disposed around the outer periphery thereof the recesses or channels 2, the outer walls $a$ of which being beveled or inclined.

As particularly illustrated in Figure 1 the spider S is mounted upon the casing head H and rests upon a packing ring 3 carried by the upper end portion of the casing head H and threaded through the adjacent wall of the head H are the holding screws 4, the inserted end portions of which having direct contact with the beveled or inclined walls of the channels or recesses 2 and in a manner whereby the assembled spider is effectively maintained in working position.

The intermediate and preferably the central portion of the bore of the assembled spider is enlarged, said enlargement being defined by registering pockets or recesses 5 provided in the opposed faces of the assembled sections 1, each of said pockets being substantially U-shaped in cross section. Substantially snugly fitting within each of the pockets or recesses 5 is a follower plate 6 also substantially U-shaped in cross section and having its open face disposed toward the bore proper of the spider S. The plate or cup 6, however, is of a depth less than the depth of the associated recess or pocket 5 so that said plate or cup 6 is capable of movement therein.

Snugly fitting within each of the plates or cups 6 is a packing 7 of rubber or other suitable material and the inner face of said packing 7 is provided therealong with a groove or channel 8 adapted to snugly receive the adjacent portion of a tubing T disposed through the assembled spider and in a manner whereby said packing serves to effectually seal the bore of the assembled spider against the flow of oil or gas other than through the tubing T.

Each of the sections 1 at substantially the central portion of the pocket or recess 5 is provided with an opening 9 in which is adapted to be threaded a speed screw 10 or the like. Interposed between the inserted end of the screw 10 and the intermediate portion of the plate or cup 6 is an expansion member 11, herein disclosed as a coil spring, said member or spring in addition to constantly urge the cup or plate 6 inwardly of the spider also provides yieldable means whereby a collar 12 comprised in the tubing T may readily pass through the spider S and more particularly between the opposed packings 7.

By having each of the plates or cups 6 substantially U-shaped in form the packing 7 applied therein is effectively maintained against movement in a direction circumferentially of the tubing with which the same engages and which movement is further prevented by the cross sectional configuration of the pocket or recess 5 in which said cup or plate is arranged.

One end portion of the bore of the assembled spider S is enlarged, as at 14, to provide a socket with the side walls thereof tapered inwardly, as illustrated in Figure 1.

In laying or withdrawing of pipe with a single elevator, as is well known in the oil fields or in connection with other deep wells, the slips 15 are inserted within the enlarged portion or socket 14 and the tapered wall of the socket 14 coacts with the outer or convex faces of said slips to cause the teeth 16 provided on the inner or concave faces of said slips to have requisite engagement with the tubing T to hold the same during the period the position of the elevator is being changed. It is to be understood that during the different operations of the elevator, the slips 15 are removed and applied.

As herein disclosed, the slips 15 are assembled in pairs and are pivotally engaged with the parallel arms 17 of a yoke member, the outer end portions of said yoke member being laterally extended, as at 18, to provide means whereby the slips may be readily and conveniently manipulated.

When my improved spider is adapted for use in connection with the laying or withdrawing of pipe with a plurality of elevators it is preferred that the end portion of the assembled spider provided with a socket 14 be directly engaged with the casing head as the bore of the assembled spider at such end is of a diameter to permit such operation.

While the expansible members or springs 11 serve to constantly urge the packing 7 into proper engagement with a tubing T it is also to be understood that the speed screws 10, when a tubing is first inserted through the spider, are properly adjusted to assure the requisite contact of the packing 7 with the portion of the tubing interposed between such packings.

The sections 1 of the spider S may be held in assembled relation in any desired manner but as herein disclosed I employ the bolts 19 and coacting nuts 20 as is clearly illustrated in Figure 2 of the accompanying drawings.

From the foregoing description it is thought to be obvious that a combined spider and gas saver constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A combined spider and gas saver comprising a tubular member adapted to be mounted upon a casing head, an intermediate portion of the bore of the spider being enlarged to provide opposed pockets each angular in cross section, a substantially U-shaped plate snugly engaged within each of said pockets, a packing snugly engaged within each of said plates, the opposed faces of the packing being grooved to properly engage a tubing inserted through the spider, each of the pockets being of a depth greater than the depth of the plate, said plate being movable within the pocket, said spider having openings in the wall thereof, each of said pockets having an opening in communication therewith, a member threaded within each of said openings, and an expansible member interposed between the inserted end of each of said first named members and the adjacent plate.

In testimony whereof I hereunto affix my signature.

HARVEY R. STANDLEE.